(12) United States Patent
Takeda et al.

(10) Patent No.: US 9,882,393 B2
(45) Date of Patent: Jan. 30, 2018

(54) WIRELESS POWER SUPPLY APPARATUS FOR LINEAR MOTION TYPE ROBOT

(71) Applicants: DENSO WAVE INCORPORATED, Chita-gun, Aichi-pref. (JP); DENSO CORPORATION, Kariya, Aichi-pref. (JP)

(72) Inventors: Shigeru Takeda, Okazaki (JP); Masayoshi Sugino, Anjo (JP); Hiroshi Kondo, Nagoya (JP)

(73) Assignees: DENSO WAVE INCORPORATED, Aichi-pref. (JP); DENSO CORPORATION, Kariya (JP)

( * ) Notice: Subject to any disclaimer, the term of this patent is extended or adjusted under 35 U.S.C. 154(b) by 244 days.

(21) Appl. No.: 14/672,615

(22) Filed: Mar. 30, 2015

(65) Prior Publication Data
US 2015/0280454 A1    Oct. 1, 2015

(30) Foreign Application Priority Data
Mar. 28, 2014    (JP) ................................ 2014-068789

(51) Int. Cl.
*H02J 5/00*    (2016.01)
*H02J 50/12*    (2016.01)
(Continued)

(52) U.S. Cl.
CPC .............. *H02J 5/005* (2013.01); *H02J 50/12* (2016.02); *H02J 50/60* (2016.02); *H02J 50/80* (2016.02)

(58) Field of Classification Search
CPC . H01F 38/14; H02J 5/005; H02J 17/00; H02J 50/12; H02J 50/60; H04B 5/0037;
(Continued)

(56) References Cited

U.S. PATENT DOCUMENTS

2009/0079269 A1*    3/2009   Jin .......................... H02J 7/025
                                                                    307/104
2011/0302078 A1*   12/2011   Failing ..................... B60L 3/00
                                                                    705/39

(Continued)

FOREIGN PATENT DOCUMENTS

JP      2012-090373 A    5/2012
JP      2013-017247 A    1/2013
WO      2014/011776 A2   1/2014

*Primary Examiner* — Levi Gannon
(74) *Attorney, Agent, or Firm* — Oliff PLC

(57) ABSTRACT

A wireless power supply apparatus using magnetic resonance is provided for a linear motion type robot. In the apparatus, a high-frequency signal for foreign matter detection is generated. This signal is different in wavelength and frequency from a high-frequency signal for transmitting power between a power transmission coil and a power reception coil. The wavelength is wavelength $\lambda$ and the frequency is frequency f. The power transmission coil serves as an apparent antenna of which the long side is set to $\lambda/2$. At least either of a wavelength $\lambda x$ or a resonance frequency fx of a resonance wave attributed to the resonance in the antenna is detected when the high-frequency signal is supplied to the antenna. Whether or not foreign matter is present on the power transmission coil is detected based on the wavelength $\lambda x$ or the resonance frequency fx.

2 Claims, 4 Drawing Sheets

(51) Int. Cl.
*H02J 50/80* (2016.01)
*H02J 50/60* (2016.01)

(58) Field of Classification Search
CPC ... H04B 5/0075; H04B 5/0081; H04B 5/0093
USPC .......................................................... 307/104
See application file for complete search history.

(56) References Cited

U.S. PATENT DOCUMENTS

| | | |
|---|---|---|
| 2012/0091989 A1 | 4/2012 | Uramoto et al. |
| 2012/0329405 A1* | 12/2012 | Lee ................. H02J 17/00 455/73 |
| 2014/0015329 A1 | 1/2014 | Widmer et al. |
| 2014/0015522 A1 | 1/2014 | Widmer et al. |
| 2015/0311725 A1* | 10/2015 | Yamamoto ............ G01V 3/104 307/104 |

* cited by examiner

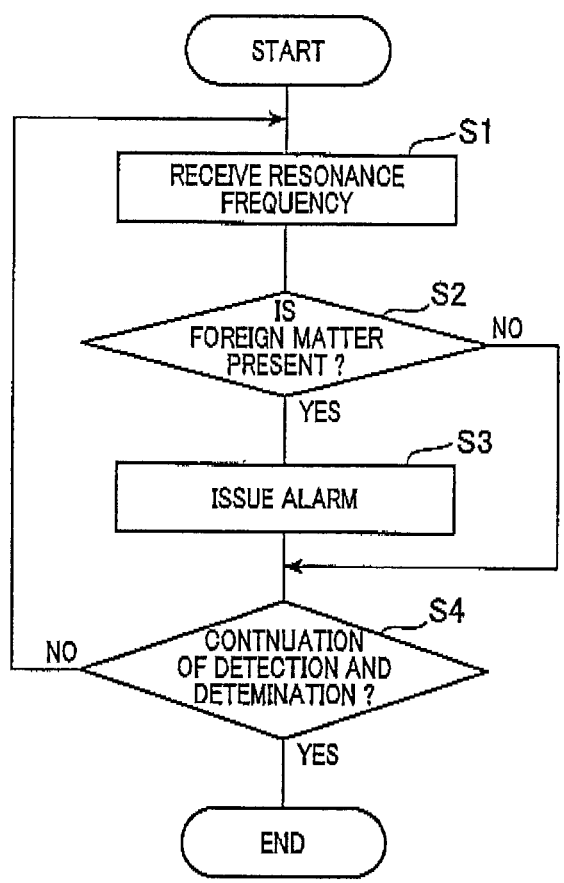

WIRELESS POWER SUPPLY APPARATUS FOR LINEAR MOTION TYPE ROBOT

CROSS-REFERENCE TO RELATED APPLICATION

This application is based on and claims the benefit of priority from earlier Japanese Patent Application No. 2014-068789 filed Mar. 28, 2014 the description of which are incorporated herein by reference.

BACKGROUND OF THE INVENTION

Field of the Invention

The present invention relates to a wireless power supply apparatus using magnetic resonance that is used in a linear motion type robot.

Description of the Related Art

Conventionally, linear motion type robots (or liner motion type transfer robots) are used in a wide range of facilities, such as factories. A typical linear motion type robots includes a movable unit that moves along a fixed rail unit that is linear or curved in shape. The movable unit has a motor and moves along the rail unit using force generated by the motor. In a conventional linear motion type robot such as this, power is supplied from a power supply to the motor via a power supply cable that is housed in a cable housing member, such as a cableveyor (registered trademark). However, in a linear motion type robot that includes the cable housing member, the movable unit moves, by necessity, so as to pull the cable housing member along with itself. Therefore, the motor that drives the movable unit is required to provide output that takes into consideration the weight of the cable housing member, in addition to the weight of the movable unit and the weight of a member to be carried by the movable unit. As a result, the size of the motor driving the movable unit increases, leading to increased size of the overall robot equipment.

Therefore, supplying power wirelessly between a fixed unit and a movable unit is being considered. As a result of power being supplied wirelessly from the fixed unit to the movable unit, members required for power supply, such as the cable housing member, are eliminated. Therefore, weight reduction and reduced output from the motor can be achieved, leading to size reduction of the overall equipment.

In wireless power supply, a gap is, of course, formed between the fixed unit on the power transmission side and the movable unit on the power reception side. When foreign matter, such as a piece of metal, becomes stuck in the gap, there is concern that an induction current, such as an eddy current, will be generated in the foreign matter, thereby causing heat generation in the foreign matter. Therefore, JP-2012-90373 proposes detecting foreign matter by Q values detected in the power-transmission-side coil and the power-reception-side coil, on the power reception side. In addition, JP-A-2013-17247 proposes directly detecting heat generation in foreign matter using a temperature sensor.

However, in both JP-2012-90373 and JP-A-2013-17247, described above, foreign matter cannot be detected unless the foreign matter becomes stuck between the power-transmission-side coil and the power-reception-side coil. In other words, in JP-2012-90373 and JP-A-2013-17247, variations in the Q value and heat generation in the foreign matter do not occur unless power is transmitted from the power transmission side to the power reception side. Therefore, in the techniques disclosed in JP-2012-90373 and JP-A-2013-17247, there is a problem in that early detection of foreign matter is difficult and safety is low. In a robot which requires reduced size, the gap between the power-transmission-side coil and the power-reception-side coil also becomes small as a matter of course. When foreign matter cannot be detected unless the foreign matter is stuck between the power-transmission-side coil and the power-reception-side coil, if the foreign matter becomes stuck in the gap between the coils that has become smaller in accompaniment with size reduction, jamming may occur and the functions of the robot may be hindered. In addition, in a linear motion type robot that uses wireless power supply, increase in size of the overall robot equipment due to additional apparatuses is not desirable. In other words, JP-A-2013-17247, in which foreign matter is detected based on image information captured by a camera and a temperature sensor is used, is problematic in that additional apparatuses are required and the technique is not suitable for robot equipment.

Therefore, an object of the present invention is to provide a wireless power supply apparatus for a linear motion type robot that detects, with high accuracy and at an early stage, foreign matter that may be stuck between a power transmission coil and a power reception coil, without requiring additional equipment.

SUMMARY

According to an exemplary embodiment, power is provided without contact between a pair of a power transmission coil and a power reception coil using magnetic resonance. In other words, magnetic resonance is generated between the power transmission coil and the power reception coil by a high-frequency signal supplied to the power transmission coil, and power is supplied from the power transmission coil to the power reception coil using the magnetic resonance. In the exemplary embodiment, the power transmission coil functions as an apparent antenna. In other words, a high-frequency signal generating means generates a high-frequency signal for foreign matter detection having different wavelength and frequency from the high-frequency signal for power transmission, and transmits the signal from the power transmission coil. At this time, the high-frequency signal generating means generates a high-frequency signal having a frequency f. The power transmission coil serves as an apparent antenna of which the long side is set to $\lambda/2$ in relation to a wavelength $\lambda$ corresponding to the frequency f. A resonance wave detecting means detects at least either of a wavelength $\lambda x$ or a frequency fx of a resonance wave in the antenna when the high-frequency signal for foreign matter detection having the frequency f and the wavelength $\lambda$ is supplied to the power transmission coil that serves as the apparent antenna.

When foreign matter composed of, for example, metal is attached to the power transmission coil that functions as an antenna, the overall length of the long side of the apparent antenna configured by the power transmission coil changes. Should the foreign matter be attached near the center of the power transmission coil, the length of the apparent antenna configured by the power transmission coil becomes one-half. Therefore, when the high-frequency signal for foreign matter detection having the wavelength $\lambda$ is supplied to the power transmission coil, the wavelength $\lambda x$ of the resonance wave differs from the wavelength $\lambda$ of when foreign matter is not attached. A foreign matter detecting means detects whether or not foreign matter is attached to the power transmission coil based on the resonance frequency fx or the wavelength $\lambda x$ during resonance that has been detected by the resonance wave detecting means. In this way, in the exemplary embodiment, attention is given to the change in length of the apparent antenna configured by the power transmission coil when foreign matter is attached to the power transmission coil. As a result of the change in length of the apparent antenna, the resonance frequency fx and the wavelength λx during resonance change. Thus, as a result of detection of the resonance frequency fx or the wavelength λx, attachment of foreign matter to the power transmission coil is detected regardless of whether or not power transmission is established between the power transmission coil and the power reception coil.

Therefore, foreign matter that may become stuck between the power transmission coil and the power reception coil can be detected with high accuracy at an early stage. In other words, in the exemplary embodiment in which wireless power supply is performed using magnetic resonance, the power transmission coil also functions as an apparent antenna. Therefore, when foreign matter is attached to the power transmission coil, the antenna length of the power transmission coil changes as a result of the foreign matter. As a result, when the high-frequency signal for foreign matter detection is supplied to the power transmission coil, the detected wavelength of the high-frequency signal changes based on whether or not the foreign matter. Therefore, foreign matter attached to the power transmission coil can be detected before getting stuck between the power transmission coil and the power reception coil.

In addition, in the exemplary embodiment, the power transmission coil is used as the apparent antenna because wireless power supply using magnetic resonance is performed. Therefore, a new configuration for detecting resonance is not required to be separately provided. Thus, additional equipment is not required and increase in the size of the equipment can be avoided.

In another exemplary embodiment, the high-frequency signal for foreign matter detection has the same frequency as that of a signal for controlling the linear motion type robot. A signal for controlling the movable side is also transmitted between the power transmission oil and the power reception coil, in addition to power for driving the movable side. In other words, the high-frequency signal for power transmission and the signal for control are superimposed and transmitted from the power transmission coil to the power reception coil. In addition, the period during which foreign matter on the power transmission coil is detected and the period during which the signal for control is transmitted from the power transmission coil to the power reception coil are not required to match. Therefore, as a result of the signal for control being used as the high-frequency signal for foreign matter detection, foreign matter attached to the power transmission coil is detected using an existing configuration. Thus, foreign matter stuck between the power transmission coil and the power reception coil can be detected with high accuracy and at an early stage, without increase in the number of components or the structure becoming more complex.

BRIEF DESCRIPTION OF THE DRAWINGS

In the accompanying drawings:
FIG. 6 is an outlined flowchart showing a process for determining the presence of foreign matter.

DETAILED DESCRIPTION OF THE PREFERRED EMBODIMENTS

An embodiment of a linear motion type robot to which a wireless power supply apparatus is applied will hereinafter be described with reference to FIGS. 1 to 6.

First, using FIG. 2, the configuration of a liner motion type robot 10 according to the embodiment will now be described.

Figure 2:
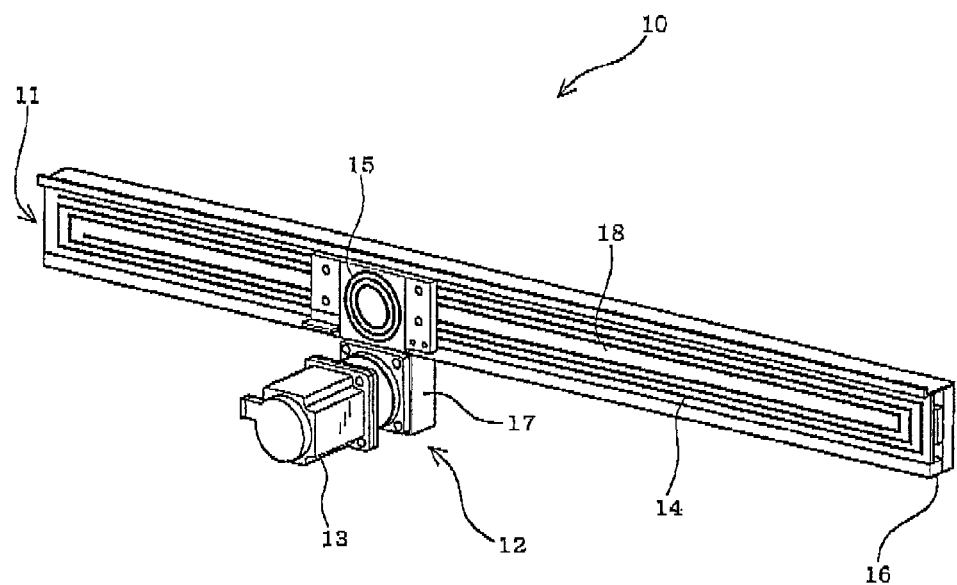
FIG. 2 is a schematic perspective view of a linear motion type robot to which the wireless power supply apparatus according to the embodiment is applied.
Figure 3:
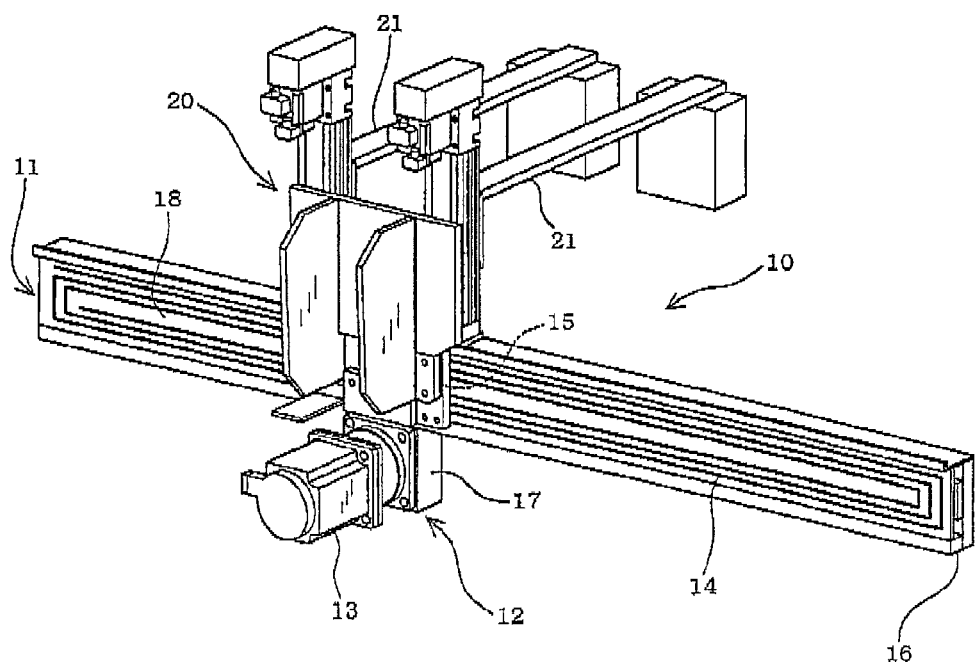
FIG. 3 is a schematic perspective view of the linear motion type robot to which the wireless power supply apparatus according to the embodiment is applied.

As shown in FIG. 2, the linear motion type robot 10 includes a rail unit 11, a movable unit 12, a motor 13, a power transmission coil 14, and a power reception coil 15. The rail unit 11 is formed into a linear shape. The rail unit 11 may also be formed into an arbitrary curved shape. The linear motion type robot 10 is provided in a production facility, a distribution facility, or the like. The rail unit 11 is fixed, for example, to the facility in which the linear motion type robot 10 is installed. The rail unit 11 has a rack 16. The rack 16 is provided along the rail unit 11. According to the embodiment shown in FIG. 2, the rack 16 is provided on the lower edge of the rail unit 11.

The movable unit 12 moves along the rail unit 11 while being guided by the rail unit 11. In other words, the movable unit 12 moves in relation to the rail unit 11 which is fixed to the facility. The movable unit 12 has a driving force transmitting unit 17. The driving force transmitting unit 17 has a pinion (not shown) that meshes with the rack 16 on the rail unit 11. The motor 13 is provided integrally with the movable unit 12 and moves along the rail unit 11 together with the so movable unit 12. The motor 13 supplies the driving force to the driving force transmitting unit 17. The driving force of the motor 13 is transmitted to the rack 16 via the driving force transmitting unit 17. As a result, the pinion of the driving force transmitting unit 17 that is meshed with the rack 16 rotates due to the driving force from the motor 13, and the movable unit 12 relatively moves in relation to the rail unit 11. The linear robot 10 is not limited to the configuration in which the driving force from the motor 13 is transmitted to the rack 16 on the rail unit 11 via the driving force transmitting unit 17. For example, a configuration is possible in which the rail unit 11 is provided with a ring-shaped belt, and the movable unit 12 moves in relation to the rail unit 11 using the frictional force generated with the belt.

The power transmission coil 14 is provided along the rail unit 11. The power transmission coil 14 is formed into a planar coil that is wound into a planar shape and is provided on a side surface of the rail unit 11. In other words, the power transmission coil 14 is formed into a planar shape on a substrate 18 provided on the side surface of the rail unit 11.

The power reception coil 15 is provided in the movable unit 12 and moves along the rail unit 11 integrally with the movable unit 12, together with the motor 13 and the driving force transmitting unit 17. The power reception coil 15 opposes the power transmission coil 14 provided on the rail unit 11. The power reception coil 15 is formed so that the area thereof that opposes the power transmission coil 14 is smaller than the area of the power transmission coil 14. The power transmission coil 14 and the power reception coil 15 are provided so as to be separated from each other with a gap formed therebetween. More specifically, a gap of several millimeters to several tens of millimeters is formed between the power transmission coil 14 and the power reception coil 15. Therefore, the power transmission coil 14 and the power reception coil 15 are in a non-contact state. Between the power transmission coil 14 and the power reception coil 15, the power reception coil 15 can receive power without coming into contact with the power transmission coil 14 through use of magnetic resonance. In other words, the power reception coil 15 receives power, which is consumed by the motor 13 and the like, from the power transmission coil 14 without contact therewith.

In the linear motion type robot 10 such as that described above, various functional units are provided in the movable unit 12. For example, in the example shown in FIG. 3, the movable unit 12 of the linear motion type robot 10 has a lift mechanism unit 20. The lift mechanism unit 20 drives a stage portion 21 in a direction perpendicular to the moving direction of the movable unit 12 using driving force generated from a power source, such as a linear motor. In this case, the power required to operate the power source is supplied by non-contact power supply between the power transmission coil 14 and the power reception coil 15, in a manner similar to the power required to operate the motor 13 in the movable unit 12.

Next, power supply in the above-described linear motion type robot 10 will be described.

Figure 1:
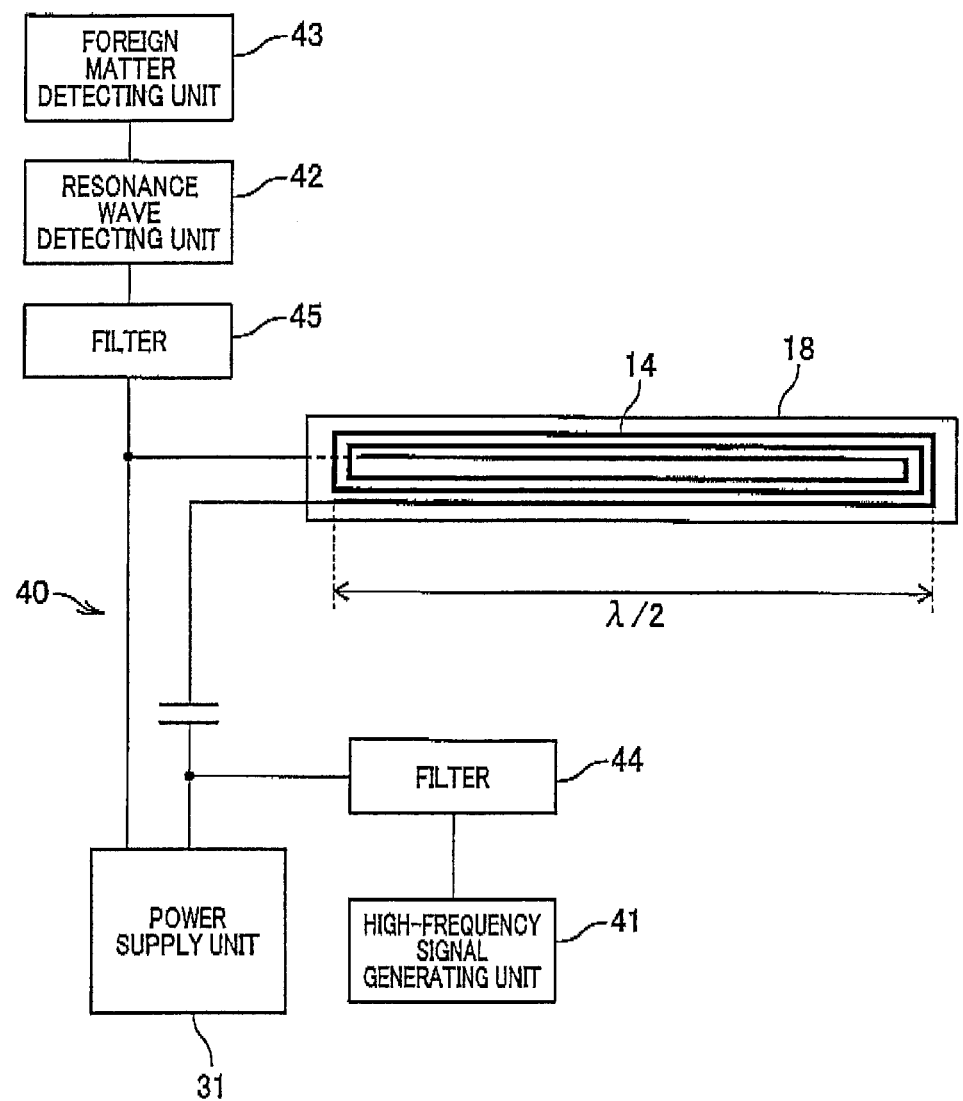
FIG. 1 is a schematic diagram of a configuration of a wireless power supply apparatus according to an embodiment.

As shown in FIG. 1, the power transmission coil 14 is connected to the power supply unit 31. The power supply unit 31 supplies high-frequency signal power of several megahertz to several tens of megahertz to the power transmission coil 14 to establish magnetic resonance between the power transmission coil 14 and the power reception coil 15. The high-frequency signal power supplied by the power supply unit 31 is determined arbitrarily to establish the magnetic resonance based on, for example, the characteristics of the power transmission coil 14 and the power reception coil 15. The power supply unit 31 supplies the power transmission coil 14 with high-frequency signal power for power transmission. As a result, when the high-frequency signal power is being supplied to the power transmission coil 14, magnetic resonance is generated in the portion in which the power transmission coil 14 and the power reception coil 15 are oppose each other. Therefore, the power reception coil 15 receives power, without contact, from the power transmission coil 14 using the magnetic resonance.

On the other hand, even when the high-frequency signal power is being supplied to the power transmission coil 14, if the power reception coil 15 is not opposing the power transmission coil 14, the power transmission coil 14 does not radiate an unnecessary electric or magnetic field. In other words, when the high-frequency signal power is being supplied to the power transmission coil 14, impedance decreases in the portion in which the power transmission coil 14 and the power reception coil 15 are oppose each other and power is transmitted and received by magnetic resonance. Conversely, in a portion in which the power transmission coil 14 and the power reception coil 15 do not oppose each other, impedance becomes extremely high. Therefore, very little current flows and an electric or magnetic field is barely radiated in the portion in which the power transmission coil 14 and the power reception coil 15 do not oppose each other.

Next, a wireless power supply apparatus 40 used in the above-described linear motion type robot 10 will be described.

The wireless power supply apparatus 40 according to the present embodiment includes, in addition the above-described power transmission coil 14 and the power supply unit 31, a high-frequency signal generating unit 41, a resonance wave detecting unit 42, and a foreign matter detecting unit 43. The power transmission coil 14 functions as an apparent antenna when detection of foreign matter is performed in the wireless power supply apparatus 40. The high-frequency signal generating unit 41 generates a high-frequency signal for foreign matter detection and supplies the generated high-frequency signal to the power transmission coil 14 that is the antenna. In the present embodiment, the "foreign matter" is defined as electrically conductive matters, which include metallic pieces or carbon pieces.

The high-frequency signal generating unit 41 generates a high-frequency signal for foreign matter detection that has different wavelength and frequency from the high-frequency signal generated by the above-described power supply unit 31. In other words, the high-frequency signal generating unit 41 generates a high-frequency signal for foreign matter detection that has a wavelength $\lambda$ and a frequency f. According to the present embodiment, the frequency f of the high-frequency signal for foreign matter detection is set to several hundred megahertz which is higher than the frequency for power transmission outputted from the power supply unit 31. According to the present embodiment, the frequency of the high-frequency signal for power transmission is set to 6.78 MHz and the frequency of the high-frequency signal for foreign matter detection is set to 478 MHz. The frequency value of the high-frequency signal for power transmission and that of the high-frequency signal for foreign matter detection are both examples and can be arbitrarily changed.

In addition, the high-frequency signal generating unit 41 may generate a high-frequency signal for foreign matter detection that has the same frequency as a signal used to control the linear motion type robot 10. A signal for controlling the movable unit 12 is transmitted between the power transmission coil 14 and the power reception coil 15, in addition to the power for driving the movable unit 12. In other words, the high-frequency signal for power transmission and the signal for control are superimposed and transmitted from the power transmission coil 14 to the power reception coil 15 using magnetic resonance. In addition, detection of foreign matter on the power transmission coil 14 is performed before the period in which the signal for control is oscillated from the power transmission coil 14 to the power reception coil 15.

Therefore, even when the signal for control is used as the high-frequency signal for foreign matter detection, control of the movable unit 12 is not hindered. Therefore, the high-frequency signal generating unit 41 generates a high-frequency signal for foreign matter detection that has the same frequency as the signal used for control. As a result, foreign matter attached to the power transmission coil 14 is detected using a signal for control that is already present.

The power transmission coil 14 functions as an antenna that oscillates the high-frequency signal for foreign matter detection generated by the high-frequency signal generating unit 41. The long side of the power transmission coil 14 is set to $\lambda/2$, in relation to the wavelength $\lambda$ of the high-frequency signal for foreign matter detection. As a result, when the high-frequency signal for foreign matter detection is supplied to the power transmission coil 14, resonance is generated in the power transmission coil 14 that serves as the antenna. Resonance is established under the condition of expression (1):

$$\lambda = C / \{\in_r^{1/2} \times f\} \quad (1)$$

In the expression (1), C denotes the speed of light, $\in_r$ denotes the dielectric constant of the substrate 18 on which the power transmission coil 14 is formed, f denotes the frequency of the high-frequency signal for foreign matter detection, and λ denotes the antenna wavelength of the power transmission coil 14 when foreign matter is not present.

Figure 4:
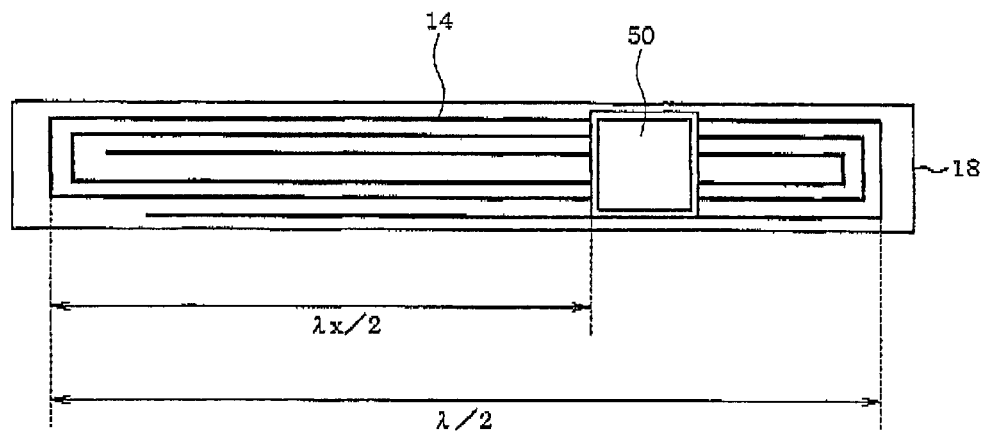
FIG. 4 is a schematic diagram of foreign matter attached to a power transmission coil in the wireless power supply apparatus according to the embodiment.

Here, when foreign matter 50 is attached to the power transmission coil 14 as shown in FIG. 4, the apparent length of the power transmission coil 14 serving as an antenna changes. Therefore, when the foreign matter 50 is attached to the power transmission coil 14, the frequency of the resonance wave becomes a resonance frequency fx and the wavelength becomes a wavelength λx. The resonance wave detecting unit 42 has a demodulator, and detects the resonance frequency λx and the wavelength fx attributed to the resonance in the power transmission coil 14. The foreign matter detecting unit 43 detects whether or not the foreign matter 50 is attached to the power transmission coil 14 based on the resonance frequency λx and the wavelength fx of the resonance wave detected by the resonance wave detecting unit 42, as shown in FIG. 6.

A filter 44 and a filter 45 are respectively inserted between the high-frequency signal generating unit 41 and the power transmission coil 14, and between the power transmission coil 14 and the resonance wave detecting unit 42. The filter 44 is inserted to prevent the power signal at the high-frequency signal for power transmission generated by the power supply unit 31 from entering the high-frequency signal generating unit 41 and destroying the high-frequency signal generating unit 41. In addition, the filter 45 is inserted to prevent damage to the resonance wave detecting unit 42 and the foreign matter detecting unit 43 by the high-frequency signal for power transmission generated by the power supply unit 31 and the high-frequency signal generated by resonance in the power transmission coil 14. The filter 44 and the filter 45 may be omitted if there is no risk of causing damage in the high-frequency signal generating unit 41, the resonance wave detecting unit 42, and the foreign matter detecting unit 43.

As shown in FIG. 4, when the foreign matter 50 (such as a metallic piece or a carbon piece) is erroneously attached to the power transmission coil 14, the apparent length of the antenna configured by the power transmission coil 14 changes. Therefore, the resonance frequency fx and the resonance wavelength λx in the power transmission coil 14 changes depending on the length of the antenna, or in other words, the position of the foreign matter 50 attached to the power transmission coil 14.

Figure 5:
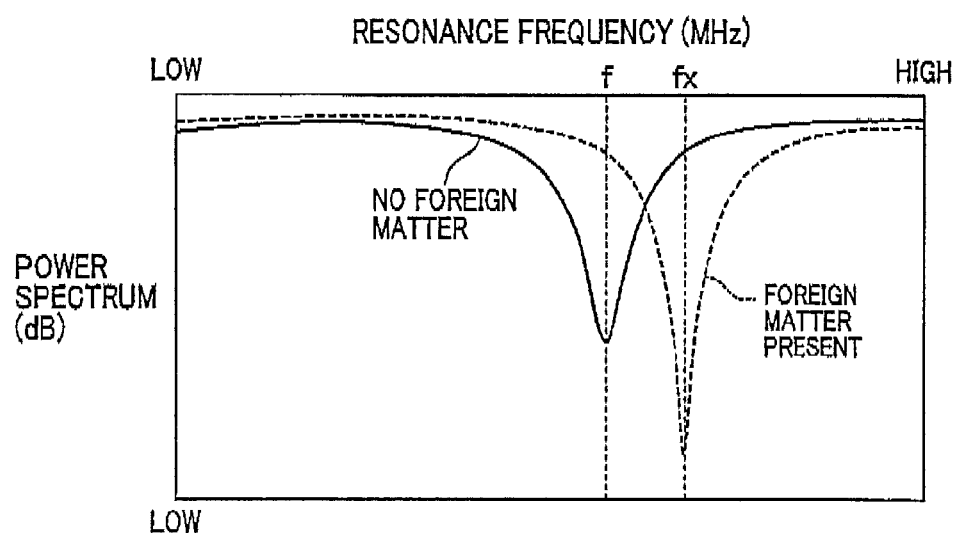
FIG. 5 is a schematic diagram of a relationship between resonance frequency and power spectrum based on the presence and absence of foreign matter in the wireless power supply apparatus according to the embodiment.

When the foreign matter 50 is not attached to the power transmission coil 14, the resonance frequency fx in the power transmission coil 14 is equivalent to the frequency f of the high-frequency signal for foreign matter detection, or in other words, f=fx, as indicated by the solid line in FIG. 5. However, when the foreign matter 50 is attached to the power transmission coil 14, the resonance frequency fx in the power transmission coil 14 differs from the frequency f of the high-frequency signal for foreign matter detection, or in other words, f≠fx (f is not equal to fx), as indicated by the broken line in FIG. 5. The resonance frequency fx and the resonance wavelength λx of the resonance wave are correlated with the length of the antenna, or in other words, the position of the foreign matter 50 attached to the power transmission coil 14.

In other words, when foreign matter is attached to the power transmission coil 14, the length of the antenna configured by the power transmission coil 14 becomes λx/2, as shown in FIG. 4. Therefore, the foreign matter detecting unit 43 can detect whether or not foreign matter is attached to the power transmission coil 14 based on the resonance frequency fx and the resonance wavelength λx of the resonance wave detected by the resonance wave detecting unit 42.

Practically, the foreign matter detecting unit 43 receives a signal showing the resonance frequency fx from the resonance wave detecting unit 42 (step S1 in FIG. 6), and determines the presence of foreign matter, as above (step S2). If it is determined that there is a foreign matter, such as a metallic piece, the unit 43 issues an alarm as a preventive countermeasure (step S3). This foreign matter detection is continued until reception of a stop signal from a user or a system (step S4).

According to the embodiment described above, the power transmission coil 14 functions as an apparent antenna that oscillates at the high-frequency signal for foreign matter detection generated by the high-frequency signal generating unit 41. The high-frequency signal generating unit 41 generates the high-frequency signal for foreign matter detection having different wavelength and frequency from the so high-frequency signal for power transmission generated by the power supply unit 31, and oscillates the high-frequency signal from the power transmission coil 14.

When the high-frequency signal for foreign matter detection having the frequency f and the wavelength λ is supplied to the power transmission coil 14, the resonance wave detecting unit 42 detects at least either of the resonance frequency fx or the wavelength λx of the resonance wave attributed to resonance in the power transmission coil 14 which serves as the antenna. As a result of detection of the resonance frequency fx or wavelength λx during resonance in the antenna configured by the power transmission coil 14, attachment of foreign matter to the power transmission coil 14 can be detected, regardless of whether or not power transmission is established between the power transmission coil 14 and the power reception coil 15. Therefore, foreign matter that is stuck between the transmission coil 14 and the reception coil 15 can be detected with high accuracy at an early stage.

In addition, according to the embodiment, the power transmission coil 14 is used, as is, as an apparent antenna. Therefore, a new configuration for generating resonance is not required to be separately provided. In addition, according to the embodiment, a camera for detecting the foreign matter 50, a temperature sensor for detecting heating of the foreign matter 50, and the like are not required. Therefore, external apparatuses that lead to increase in the size of the equipment are not required. As a result, additional equipment is not necessary and increase in the size of the equipment can be avoided.

Furthermore, according to the embodiment, the high-frequency signal for foreign matter detection is the same frequency as that of the signal used to control the linear motion type robot 10. As a result of the signal for control being used as the high-frequency signal for foreign matter detection, the existing configuration for generating the signal for control can be used as the high-frequency signal generating unit 41. Therefore, the foreign matter 50 that is stuck between the power transmission coil 14 and the power reception coil 15 can be detected with high accuracy and at an early stage without increase in the number components or the structure becoming more complex.

The present invention described above is not limited to the above-described embodiment and can be applied to various embodiments without departing from the spirit thereof.

According to the embodiment, an example is described in which a single power transmission coil is provided along the direction in which the rail unit extends. However, a plurality of power transmission coils may be provided along the rail unit. In other words, two or more power transmission coils may be provided along the direction in which the rail unit extends. In this case, the plurality of power transmission coils are each connected in parallel to the power supply unit and the high-frequency signal generating unit. As a result of a plurality of power transmission coils being provided along the rail unit in this way, the distance over which the movable unit is able to move can be easily and arbitrarily extended.

What is claimed is:

1. A wireless power supply apparatus for a linear motion type robot that supplies power without contact between a pair of a power transmission coil and a power reception coil using magnetic resonance, the wireless power supply apparatus comprising:

a high-frequency signal generating means for generating a high-frequency signal for foreign matter detection having different wavelength and frequency from a high-frequency signal for transmitting power between the power transmission coil and the power reception coil, in which the wavelength is wavelength $\lambda$ and the frequency is frequency f;

an apparent antenna that is configured by the power transmission coil and of which the long side is set to $\lambda/2$ in relation to the wavelength $\lambda$;

a resonance wave detecting means for detecting at least either of a wavelength $\lambda x$ or a resonance frequency fx of a resonance wave attributed to resonance in the antenna when the high-frequency signal for foreign matter detection generated by the high-frequency signal generating means is supplied to the antenna; and a foreign matter detecting means for detecting whether or not foreign matter is present on the power transmission coil based on the wavelength $\lambda x$ or the resonance frequency fx detected by the resonance wave detecting means.

2. The wireless power supply apparatus for a linear motion type robot according to claim 1, wherein:

the high-frequency signal for foreign matter detection is the same frequency as the frequency of a signal for controlling the linear motion type robot.

\* \* \* \* \*